No. 12,624. REISSUED MAR. 26, 1907.
W. F. BECK, DEC'D.
C. L. BECK, EXECUTRIX.
MANIFOLDING PAD AND HOLDER.
APPLICATION FILED JAN. 25, 1907.
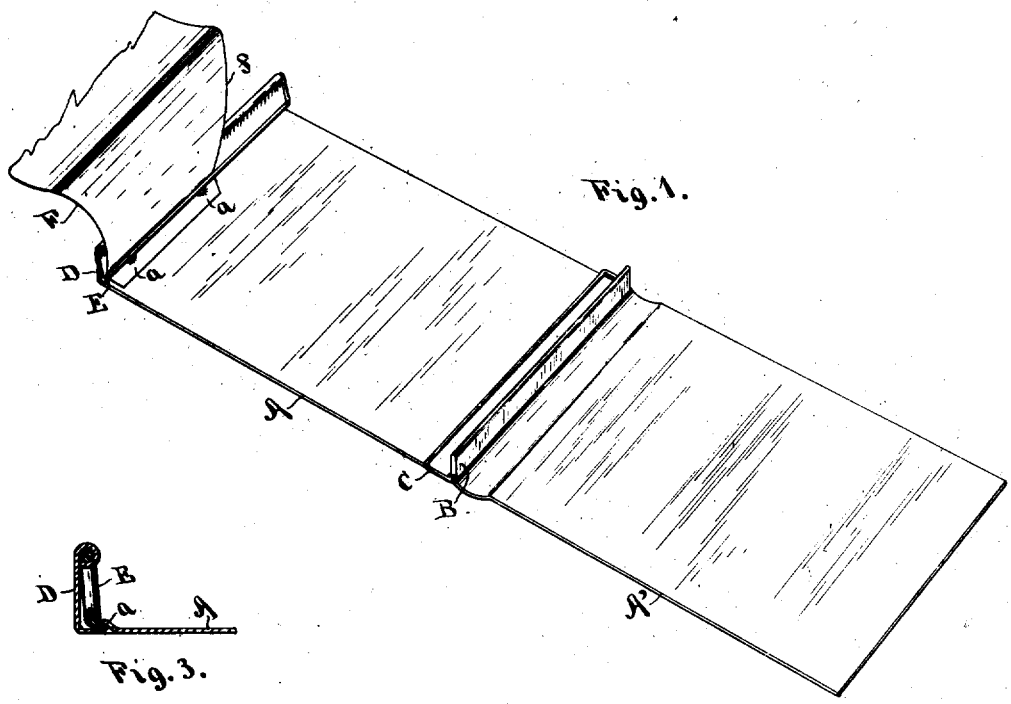
Fig. 1.
Fig. 3.
Fig. 2.
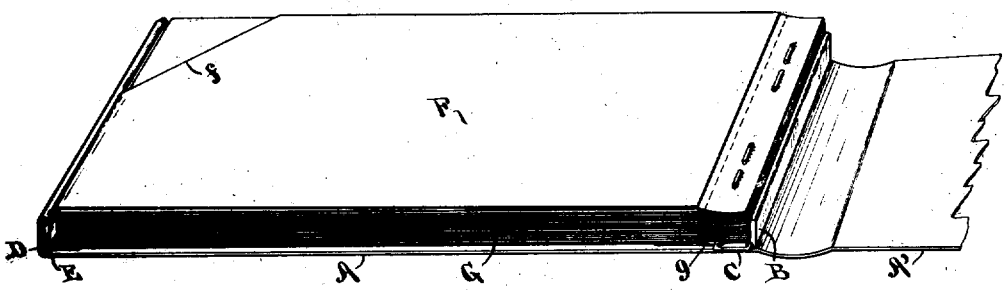
WITNESSES:
M. E. Verteck
R. V. Stoltzfus
Carrie L. Beck, Ex'x of the last will of the INVENTOR Warren F. Beck, deceased.
BY Eugene Diven
ATTORNEY

UNITED STATES PATENT OFFICE.

CARRIE L. BECK, OF ELMIRA, NEW YORK, EXECUTRIX OF WARREN F. BECK, DECEASED.

MANIFOLDING-PAD AND HOLDER.

No. 12,624. Specification of Reissued Letters Patent. Reissued Mar. 26, 1907.

Original No. 647,934, dated April 24, 1900. Application for reissue filed January 25, 1907. Serial No. 353,956.

*To all whom it may concern:*

Be it known that WARREN F. BECK, deceased, late a citizen of the United States, residing at Elmira, in the county of Chemung and State of New York, did invent certain new and useful Improvements in Manifolding-Pads and Holders, of which the following is a specification.

This invention relates to improvements in the pads used by merchants and others in taking manifold copies of orders, &c., and to the holders for such pads, the objects of the improvements being, first, to provide a simple and cheap form of holder wherein a pad and a carbon or transfer sheet may be placed and replaced independent of one another, and, second, to provide means for manipulating the leaves of the pad without touching the transfer-sheet with the fingers. These objects are accomplished by the construction and arrangement of the parts as illustrated in the accompanying drawings, in which—

Figure 1 represents a perspective view of the holder with the carbon-sheet in place; Fig. 2, a perspective view showing the pad and carbon-sheet secured in the holder in their relative positions, and Fig. 3 a detail showing the fastening device for the carbon-sheet.

Similar letters refer to similar parts throughout the several views.

A A′ represent the leaves of a hinged cover or holder for the pad, the back leaf A being made of a stiff material, preferably of tin or other sheet metal. One end of the leaf A is bent up at B, and a wire bail C is hinged in the angle between A and B. The opposite end of leaf A is also bent up at D, and a wire bail E is hinged at the top of this bent-up portion D. The bail E swings down into the angle between A and D and is held in the angle by reason of the slight protuberances or bosses *a a*, punched up from the back of the leaf A, the bail snapping over these projections when thrown down into the angle, as shown more particularly in Fig. 3. The carbon or transfer sheet F has its edge slipped under the bail E, and when the bail is thrown down into place said sheet is firmly secured to the holder by reason of the bail and the bosses *a a*, the relative position of the parts being shown in Fig. 1. The bent-up portion B and bail C constitute the fastening for the pad; but as this portion of the device is made the subject of a separate patent, numbered 647,933, granted to said Warren F. Beck April 24, 1900, no claim is made to it herein. The pad G, which is to be used in this holder, is made up of a number of separate leaves stapled or otherwise fastened together at one end and having a fastening-strip *g* of stiffish paper fastened at the back, this fastening-strip being slipped underneath the bail C and the pad being held from endwise movement by the bent-up portion B, as shown in Fig. 2. The transfer-sheet F is folded down over the pad, as shown in said figure, and has one corner cut away at *f*, leaving exposed a corner of the leaves of the pad. The transfer-sheet thus has one end rigidly held in position with relation to the pad on a line parallel with and adjacent to the free ends of the leaves of the pad, and the sheet is thereby held in fixed relation to and in proper position upon the leaves which it substantially covers. It will readily be seen that if the holder and pad are held in the left hand the individual leaves of the pad may be taken between the thumb and finger of the right hand at the upper right-hand corner and drawn out and away from the transfer-sheet without touching the fingers to said sheet, the free ends of the pad-leaves being thus adapted to be drawn directly away from the line of attachment of the sheet without disturbing the fixed relation of the sheet to the pad, the sheet being capable of motion only in a direction parallel with the lateral edges of the leaves of the pad. Thus in taking an order the first original leaf, which in the position assumed for the parts in Fig. 2 lies beneath the transfer-sheet, will be drawn out and back, allowing the transfer-sheet to drop upon the copy-leaf. The original is then laid down upon the back of the transfer-sheet and the order or other memorandum written thereon and transferred to the copy-leaf. The original and copy may then be severed from the pad, the duplicate leaf being drawn away from beneath the transfer-sheet without touching said sheet in the manner before described, or, if desired, the original and copy may be folded back without detaching from the pad and another order or memorandum placed upon the next original and copy leaves, as before.

Where triplicate copies of an order or memorandum are to be taken, the transfer-sheet F is coated on both sides, and hence it is more difficult to handle without soiling the fingers. It will therefore be seen that the construction of the parts is especially adapted to meet this difficulty, as the transfer-sheet is not required to be handled after it is once placed in the holder.

This type of pad is especially adapted for use where orders are taken from house to house, the leaf or leaves being retained in the pad until the orders are given in at the store and the goods are put up for delivery.

Instead of arranging the parts as illustrated in Fig. 1 the relative positions of the bent-up portions B and D and the bails C and E may be reversed, and the cover A′ may also be dispensed with. The invention is not confined solely to the use of a transfer-sheet cut away as described in connection with the pad and holder illustrated, as the transfer-sheet of this character may be otherwise fastened in a holder, or it may be fastened to the back of the pad, where such pad is intended to be used alone or in connection with other holders; but the invention is to be restricted to constructions in which the cut-away transfer-sheet has one end rigidly held in position with relation to the pad on a line parallel with and adjacent to the free ends of the leaves of the pad, so that the transfer-sheet is not liable to be bodily shifted out of its proper relation to the pad by the act of withdrawing a leaf from the pad, the transfer-sheet being capable of movement only in a direction parallel with the lateral edges of the pad-leaves, and, further, to constructions in which the transfer-sheet as it lies upon the pad substantially conceals the pad-leaves.

Having thus described the improvements, what is claimed as the invention, and desired to be secured by Letters Patent, is—

1. The combination, with a holder for manifolding-pads, of a bent-up edge portion having a bail hinged at the top thereof, and means for locking the bail in the angle between said parts for the purpose set forth.

2. The combination with a manifolding-pad, the leaves of which are bound together at one end, of a transfer-sheet having one end held rigidly in position with relation to the pad on a line parallel with and adjacent to the free ends of the leaves of the pad, said sheet being movable only in a direction parallel with the lateral edges of the leaves of the pad and overlying and substantially covering said leaves and having a portion cut away to expose said leaves at or near the free ends, the free ends of the leaves of the pad being adapted to be grasped where exposed by said cut-away portion and drawn directly away from the line of attachment of the transfer-sheet when a leaf is withdrawn from beneath the sheet without disturbing said fixed relation of said transfer-sheet with respect to the pad.

In testimony whereof I have affixed my signature in the presence of two witnesses.

CARRIE L. BECK,
*Executrix of the last will of Warren F. Beck, deceased.*

Witnesses:
A. M. BOVIER,
L. H. BECK.